(12) United States Patent
Sulzbach et al.

(10) Patent No.: US 6,395,806 B1
(45) Date of Patent: May 28, 2002

(54) HARDENERS FOR EPOXY RESINS, PROCESSES FOR PRODUCING THE SAME AND METHODS OF USING THE SAME

(75) Inventors: Horst Sulzbach; Thomas Huver, both of Duesseldorf; Hans-Josef Thomas, Monheim, all of (DE); Vincenzo Foglianisi, Milan (IT)

(73) Assignee: Cognis Deutschland GmbH, Duesseldorf (DE)

(*) Notice: Subject to any disclaimer, the term of this patent is extended or adjusted under 35 U.S.C. 154(b) by 0 days.

(21) Appl. No.: 09/743,214

(22) PCT Filed: Jun. 26, 1999

(86) PCT No.: PCT/EP99/04448
§ 371 (c)(1),
(2), (4) Date: May 7, 2001

(87) PCT Pub. No.: WO00/02946
PCT Pub. Date: Jan. 20, 2000

(30) Foreign Application Priority Data

Jul. 7, 1998 (DE) .......................... 198 30 279

(51) Int. Cl.$^7$ .................. C08G 59/14; C08G 59/16; C08K 3/20
(52) U.S. Cl. .............. 523/417; 523/404; 523/414; 523/420; 525/524; 525/530; 525/531; 525/532; 528/110; 528/111
(58) Field of Search ................ 523/404, 414, 523/417, 420; 525/524, 530, 531, 532; 528/111, 110

(56) References Cited

U.S. PATENT DOCUMENTS

| | | | |
|---|---|---|---|
| 4,197,389 A | 4/1980 | Becker et al. | 528/103 |
| 4,459,393 A | * 7/1984 | Barnhoorn et al. | 525/530 |
| 4,835,241 A | * 5/1989 | Waddill | 528/111 |
| 5,032,629 A | 7/1991 | Hansen et al. | 523/414 |
| 5,231,120 A | 7/1993 | Simonsick et al. | 523/403 |
| 5,489,630 A | 2/1996 | Walker | 523/404 |
| 5,539,023 A | 7/1996 | Dreischhoff et al. | 523/404 |
| 5,548,005 A | 8/1996 | Kurth et al. | 523/414 |
| 5,567,838 A | * 10/1996 | Pugach et al. | 560/60 |
| 5,587,409 A | 12/1996 | Dreischhoff et al. | 523/404 |
| 5,641,855 A | * 6/1997 | Scherr et al. | 528/310 |
| 6,077,884 A | 6/2000 | Hess et al. | 523/417 |

FOREIGN PATENT DOCUMENTS

| | | | |
|---|---|---|---|
| DE | 212035 A | * | 8/1984 |
| EP | 0 000 605 A1 | | 2/1979 |
| EP | 0 387 418 A2 | | 9/1990 |
| EP | 0 610 787 A2 | | 8/1994 |
| EP | 0 661 314 A1 | | 7/1995 |
| EP | 0 709 418 A2 | | 5/1996 |
| EP | 0 714 924 A2 | | 6/1996 |
| EP | 0 717 059 A2 | | 6/1996 |
| EP | 0 717 063 A2 | | 6/1996 |
| GB | 2194944 A | * | 3/1988 |
| JP | 63-5055 A2 | * | 1/1988 |
| JP | 10-298143 A2 | * | 11/1998 |
| PL | 147729 B1 | * | 7/1989 |
| WO | WO 96/20970 | | 7/1996 |
| WO | WO 96/20971 | | 7/1996 |
| WO | WO 98/25988 | | 6/1998 |

OTHER PUBLICATIONS

A.G. Hinze, "Die Herstellung von Dimerfettsäuren aus ungesättigten Fettsäuren", Fette & Öle, 26, (1994), pp. 47–51.

L.S. Newtown, "Dimer Acids and their Derivatives—Potential Applications", Specialty Chemicals, (May, 1984), pp. 17, 18 & 22–24.

Daute et al., Fat Sci. Technol., 95, No. 3, (1993), pp. 91–94.

A.M. Paquin, "Epoxydverbindungen und Epoxydharze", Springer–Verlag, Berlin, (1958), Chapter V, pp. 308–461.

Lee, "Handbook of Epoxy Resins", (1967), Chapter 2, pp. 2–1 through 2–33.

Kothandaraman et al., "Radical initiated homopolymerization of 2–octyl acrylate," J. Indian Chem. Soc. (1993), vol. 70, No. 3, pp. 270–271.*

* cited by examiner

Primary Examiner—Robert E. L. Sellers
(74) Attorney, Agent, or Firm—John E. Drach; Aaron R. Ettelman

(57) ABSTRACT

Hardeners for epoxy resins produced by reacting one or more α,β-unsaturated carboxylic acid esters with one or more hydroxy compounds, reacting the thus formed intermediate with one or more aminopolyalkylene oxide compounds, reacting the thus formed intermediate with one or more polyepoxide compounds, and reacting the thus formed intermediate with one or more amines are described. Processes for their production, aqueous dispersions containing the same and methods for their use are also described.

15 Claims, No Drawings

HARDENERS FOR EPOXY RESINS, PROCESSES FOR PRODUCING THE SAME AND METHODS OF USING THE SAME

BACKGROUND OF THE INVENTION

For many years, curable epoxy resins have been used as components in coating compositions. However, the properties of coatings produced using aqueous epoxy resin dispersions have long been considered inferior to those of coatings in which the resin is used in the form of a solution in an organic solvent. This was mainly attributed to the fact that the emulsifiers used, for example nonylphenol ethoxylates, migrate to the surface of the film where they adversely affect its properties. One way of solving this problem is to use so-called reactive emulsifiers which, where the epoxy resin is crosslinked with a diamine or polyamine or other hardener, react with the hardener and thus become part of the coating. Aqueous dispersions of special reactive emulsifiers are known from the prior art.

EP-A-605 and U.S. Pat. No. 4,197,389 describe a hardener in the form of a reaction product of a) at least one polyepoxy compound, b) at least one polyalkylene polyether polyol and c) at least one polyamine.

EP-A-387 418, EP-A-714 924 and U.S. Pat. No. 5,489,630 describe hardeners for epoxy resins which are obtained by reacting polyalkylene polyether amines with di- and/or polyepoxy compounds to form an intermediate product and reacting the intermediate product obtained with a primary or secondary amine.

EP-A-717 059 describes hardeners for epoxy resins which are obtained by reacting a polyalkylene oxide polyether monoalcohol with a polyepoxide to form an intermediate product and reacting the intermediate product obtained with a polyamine.

EP-A-717 063 describes hardeners for epoxy resins which are obtained by reacting a polyalkylene oxide monoamine with di- and/or polycarboxylic acids to form an intermediate product and reacting the intermediate product obtained with a diamine or polyamine.

EP-A-709 418 describes a hardener for epoxy resins which is obtained by reaction of (A) a polyamine, (B) an alkoxy polyethylene polyether compound containing epoxy groups and (C) a hydrophobic epoxy compound.

BRIEF SUMMARY OF THE INVENTION

The present invention relates generally to hardeners for epoxy resins, the hardeners based on α,β-unsaturated carboxylic acid esters, processes for their production, aqueous dispersions containing such hardeners, and to their use in coating solid substrates.

The problem addressed by the present invention was to provide hardeners for curable epoxy resins which, unless they were soluble in water, on the one hand would be self-dispersible in water, but which in addition would also be suitable as dispersants for curable epoxy resins in aqueous media.

The expression "self-dispersible" in the context of the present invention means that the hardeners can be dispersed or emulsified spontaneously in aqueous media without the use of additional additives, such as emulsifying or dispersing additives. In other words, the hardeners to be developed are those which would be capable of self-dispersion and/or self-emulsification in aqueous media. In the interests of simplicity, the term "self-dispersing" is used for this property throughout the present specification.

The hardeners to be developed would be above all so-called reactive hardeners, i.e. over and above the properties mentioned, namely self-dispersibility in water and, in addition, suitability as dispersants for curable epoxy resins in aqueous media, would be capable of reacting with curable epoxy resins, i.e. of being hardeners for curable epoxy resins.

Another problem addressed by the invention was to provide aqueous dispersions of self-dispersible hardeners which would be distinguished by high stability in storage under practical storage conditions.

Another problem addressed by the invention was to provide coating compositions containing a self-dispersible hardener, the coating obtained from the coating composition after the hardening process being distinguished by excellent properties.

It has now surprisingly been found that hardeners obtainable by reaction of α,β-unsaturated carboxylic acid esters with hydroxy compounds, subsequent reaction of the intermediate product obtained with mono-, di- or polyaminopolyalkylene oxide compounds, reaction of the intermediate product obtained with an epoxy resin known from the prior art and, finally, reaction with one or more primary and/or secondary amines excellently satisfy the requirements mentioned in every respect.

The present invention relates first to hardeners for curable epoxy resins obtainable by
  (a) reacting one or more α,β-unsaturated carboxylic acid esters (I)

$$R^2R^3C\!=\!C(R^4)COOR^1 \qquad (I)$$

where $R^1$ is an aromatic or aliphatic radical containing up to 15 carbon atoms, the substituents $R^2$, $R^3$ and $R^4$ independently of one another represent hydrogen, branched or unbranched, aliphatic or aromatic groups containing up to 20 carbon atoms or a group —$(CH_2)_n$—$COOR^1$, where $R^1$ is as defined above and n is a number of 0 to 10, in the presence of a transesterification catalyst with
  (b) one or more hydroxy compounds, compounds (a) and (b) being used in such quantities that the equivalent ratio of the hydroxyl groups in (b) to the ester groups $COOR^1$ in the α,β-unsaturated carboxylic acid esters (a) is in the range from 1.5:1 to 10:1,
reacting the intermediate product Z1 obtained with
  (c) one or more mono-, di- or polyaminopolyalkylene oxide compounds, an equivalent ratio of the reactive hydrogen atoms at the aminonitrogen atoms of (c) to the ester groups in the intermediate compound Z1 in the range from 1.0:1 to 1:10 being adjusted,
subsequently reacting the intermediate product Z2 obtained with
  (d) one or more polyepoxides, the equivalent ratio of oxirane rings in polyepoxide (d) to reactive hydrogen atoms of the mono-, di- or polyaminopolyalkylene oxide compounds used in (c) being adjusted to a value of 100:1 to 1.5:1,
and subsequently reacting the intermediate product Z3 obtained with
  (e) one or more primary and/or secondary amines, the equivalent ratio of oxirane rings in t he intermediate product Z3 to the reactive H atoms at the aminonitrogen atoms of (e) being adjusted to a value of 1:1.5 to 1:20.

The hardeners according to the invention are distinguished by excellent resistance to chemicals and in particular to acids. In addition, they have short pot lives.

The hardeners according to the invention are either liquid or solid substances, depending on their molecular weight.

The present invention also includes processes for the production of hardeners for curable epoxy resins.

DETAILED DESCRIPTION OF THE INVENTION

The expression "equivalent ratio" is familiar to the expert. The basic concept behind the notion of the equivalent is that, for every substance participating in a reaction, the reactive groups involved in the desired reaction are taken into consideration. By indicating an equivalent ratio, it is possible to express the ratio which all the various reactive groups of the compounds (x) and (y) used bear to one another. It is important in this connection to bear in mind that a reactive group is understood to be the smallest possible reactive group, i.e. the notion of the reactive group is not identical with the notion of the functional group. In the case of H-acid compounds, this means for example that, although OH groups or NH groups represent such reactive groups, $NH_2$ groups with two reactive H atoms positioned at the same nitrogen atom do not. In their case, the two hydrogen atoms within the functional group $NH_2$ are appropriately regarded as reactive groups so that the functional group $NH_2$ contains two reactive groups, namely the hydrogen atoms.

In one embodiment, the intermediate compound Z1 and the compound (c) are used in such quantities that the equivalent ratio of reactive hydrogen atoms at the aminonitrogen atoms of (c) to the ester groups in the intermediate compound Z1 is in the range from 4:1 to 1:4 and more particularly in the range from 2.5:1 to 1.5:1.

In another embodiment, the equivalent ratio of oxirane rings in the polyepoxide (d) to reactive hydrogen atoms of the mono-, di- or polyaminopolyalkylene oxide compounds used in (c) is adjusted to a value in the range from 50:1 to 10:1.

Examples of the α,β-unsaturated carboxylic acid esters (a) corresponding to formula (I) to be used in accordance with the invention are methyl acrylate, ethyl acrylate, dimethyl maleate, diethyl maleate, dimethyl fumarate, diethyl fumarate, dimethyl itaconate, diethyl itaconate. Particularly preferred compounds (a) are dialkyl maleates, more particularly diethyl maleate and dimethyl maleate.

The hydroxy compounds (b) may be aliphatic or aromatic. The compounds (b) should be inert to transesterification catalysts.

Examples of suitable aromatic compounds (b) are resorcinol, hydroquinone, 2,2-bis-(4-hydroxyphenyl)-propane (bisphenol A), isomer mixtures of dihydroxydiphenyl methane (bisphenol F), tetrabromobisphenol A, 4,4'-dihydroxydiphenyl cyclohexane, 4,4'-dihydroxy-3,3-dimethyldiphenyl propane, 4,4'-dihydroxydiphenyl, 4,4'-dihydroxybenzophenol, bis-(4-hydroxyphenyl)-1,1-ethane, bis-(4-hydroxyphenyl)-1,1-isobutane, bis-(4-hydroxyphenyl)-methane, bis-(4-hydroxyphenyl)-ether, bis-(4-hydroxy-phenyl)-sulfone etc. and the chlorination and bromination products of the above-mentioned compounds. Bisphenol A is the preferred aromatic compound (b).

In one preferred embodiment, the hydroxy compounds (b) are selected from the class of fatty alcohols, alkanediols and polyetherdiols. If desired, these compounds may also be alkoxylated.

The fatty alcohols are primary alcohols containing 6 to 36 carbon atoms which may be saturated or olefinically unsaturated. Examples of suitable fatty alcohols are hexanol, heptanol, octanol, pelargonyl alcohol. decanol, undecanol, lauryl alcohol, tridecanol, myristyl alcohol, pentadecanol, palmityl alcohol, heptadecanol, stearyl alcohol, nonadecanol, arachidyl alcohol, heneicosanol, behenyl alcohol, tricosanol, lignoceryl alcohol, 10-undecanol, oleyl alcohol, elaidyl alcohol, ricinolyl alcohol, linoleyl alcohol, linolenyl alcohol, gadoleyl alcohol, arachidonyl alcohol, erucyl alcohol, brassidyl alcohol.

The alkanediols are compounds corresponding to the general formula $HOCH_2$—$R^5$—$CH_2OH$, where $R^5$ is a hydrophobic hydrocarbon radical which may be saturated or unsaturated, linear or branched and may also contain aromatic structural elements. Examples are hexane-1,6-diol, heptane-1,7-diol and octane-1,8-diol, polyoxytetramethylenediols—also known as polytetrahydrofurans—and the so-called dimerdiols.

Dimerdiols are well-known commercially available compounds which are obtained, for example, by reduction of dimer fatty acid esters. The dimer fatty acids on which these dimer fatty acid esters are based are carboxylic acids which may be obtained by oligomerization of unsaturated carboxylic acids, generally fatty acids, such as oleic acid, linoleic acid, erucic acid and the like. The oligomerization is normally carried out at elevated temperature in the presence of a catalyst, for example of clay. The substances obtained—dimer fatty acids of technical quality—are mixtures in which the dimerization products predominate. However, small amounts of higher oligomers, more particularly the trimer fatty acids, are also present. Dimer fatty acids are commercially available products and are marketed in various compositions and qualities. Abundant literature is available on the subject of dimer fatty acids, cf. for example the following articles: Fette & Öle 26 (1994), pages 47–51; Speciality Chemicals 1984 (May Number), pages 17,18,22–24. Dimerdiols are well-known among experts, cf. for example a more recent article in which inter alia the production, structure and chemistry of the dimerdiols are discussed: Fat Sci. Technol. 95 (1993), No. 3, pages 91–94. According to the invention, preferred dimerdiols are those which have a dimer content of at least 50% and more particularly 75% and in which the number of carbon atoms per dimer molecule is mainly in the range from 36 to 44.

Polyetherdiols in the context of the present invention are diols corresponding to the general formula $HOCH_2$—$R^6$—$CH_2OH$, where $R^6$ is a hydrophobic hydrocarbon radical which may be saturated or unsaturated, linear or branched and may also contain aromatic structural elements and in which one or more $CH_2$ units must each be replaced by an oxygen atom.

A particularly attractive class of polyetherdiols can be obtained by alkoxylation of alkanediols, such as ethane-1,2-diol, propane-1,3-diol, propane-1,2-diol, butane-1,4-diol, butane-1,3-diol, pentane-1,5-diol, hexane-1,6-diol, heptane-1,7-diol and octane-1,8-diol, polyoxytetramethylenediols (polytetrahydrofurans) and dimerdiols. The production of these alkoxylated diols is normally carried out as follows: in a first step, the required diol is contacted with ethylene oxide and/or propylene oxide and the resulting mixture is reacted in the presence of an alkaline catalyst at temperatures of 20 to 200° C. Addition products of ethylene oxide (EO) and/or propylene oxide (PO) onto the diol used are obtained in this way. The addition products are therefore EO adducts or PO adducts or EO/PO adducts with the particular diol; in the case of the EOIPO adducts, the addition of EO and PO may take place statistically or blockwise.

Suitable transesterification cayalysts for the reaction of the compounds (a) and (b) ar any transesterification catalysts known to the expert from the prior art. Examples of suitable catalysts are sodium methylate, dibutyl tin diacetate, tetraisopropyl orthotitanate. If desired, the catalysts may be deactivated after the transesterification although this is not absolutely essential.

Suitable amino components (c) are mono-, di- or polyaminopolyalkylene oxide compounds. By this is meant that these compounds contain on the one hand one, two or more amino functions (NH or $NH_2$ functions) and, on the other hand, alkylene oxide units. The alkylene oxide units are, in particular, ethylene oxide, propylene oxide and butylene oxide, ethylene oxide and propylene oxide being particularly preferred. The compounds (c) are substances at least partly soluble in water at 20° C.

The production of the compounds (c) is known from the prior art and comprises the reaction of hydroxyfunctional compounds with alkylene oxides and subsequent conversion of the resulting terminal hydroxyl groups into amino groups.

So far as the reaction of hydroxyfunctional compounds with alkylene oxides is concerned, ethoxylation and propoxylation are of particular importance. The following procedure is usually adopted: in a first step, the required hydroxyfunctional compounds are contacted with ethylene oxide and/or propylene oxide and the resulting mixture is reacted in the presence of an alkaline catalyst at temperatures in the range from 20 to 200° C. Addition products of ethylene oxide (EO) and/or propylene oxide (PO) are obtained in this way. The addition products are preferably EO adducts or PO adducts or EOIPO adducts with the particular hydroxyfunctional compound. In the case of the EOIPO adducts, the addition of EO and PO may be carried out statistically or blockwise.

In one embodiment, substances with the general formula $R^8$—O—$R^9$—$CH_2CH(R^{10})$—$NH_2$ are used as the compounds (c). In this formula:

$R^8$ is a monofunctional organic group containing 1 to 12 carbon atoms which may be aliphatic, cycloaliphatic or aromatic, $R^9$ is a polyoxyalkylene group made up of 5 to 200 polyoxyalkylene units, more particularly EO and/or PO units, $R^{10}$ is hydrogen or an aliphatic radical containing up to 4 carbon atoms.

Particularly suitable representatives of the compounds (c) for the purposes of the present invention are the "Jeffamines"known to the expert which are commercially available substances. One example in "Jeffamine 2070" which, according to the manufacturer Texaco, is produced by reacting methanol with ethylene oxide and propylene oxide and then converting the terminal hydroxyl groups of the intermediate product initially obtained into amine groups (cf. WO 96/20971, page 10, lines 12–15).

The compounds (c) preferably have average molecular weights (number average Mn) of 148 to 5,000 and more particularly in the range from 400 to 2,000.

The epoxy compounds (d) are polyepoxides containing on average at least two epoxy groups per molecule. These epoxy compounds may be both saturated and unsaturated and aliphatic, cycloaliphatic, aromatic and heterocyclic and may also contain hydroxyl groups. They may also contain substituents which do not cause any troublesome secondary reactions under the mixing and reaction conditions, for example alkyl or aryl substituents, ether groups and the like. These epoxy compounds are preferably polyglycidyl ethers based on polyhydric, preferably dihydric alcohols, phenols, hydrogenation products of these phenols and/or novolaks (reaction products of mono- or polyhydric phenols with aldehydes, more particularly formaldehyde, in the presence of acidic catalysts). The epoxy equivalent weights of these epoxy compounds are preferably between 160 and 500 and more preferably between 170 and 250. The epoxy equivalent weight of a substance is the quantity of the substance (in grams) which contains 1 mole of oxirane rings. Preferred polyhydric phenols are the following compounds: resorcinol, hydroquinone, 2,2-bis-(4-hydroxyphenyl)-propane (bisphenol A), isomer mixtures of dihydroxydiphenyl methane (bisphenol F), tetrabromobisphenol A, 4,4'-dihydroxydiphenyl cyclohexane, 4,4'-dihydroxy-3,3-dimethyldiphenyl propane, 4,4'-dihydroxydiphenyl, 4,4'-dihydroxybenzophenol, bis-(4-hydroxyphenyl)-1,1-ethane, bis-(4-hydroxyphenyl)-1,1-isobutane, bis-(4-hydroxyphenyl)-methane, bis-(4-hydroxyphenyl)-ether, bis-(4-hydroxy-phenyl)-sulfone etc. and the chlorination and bromination products of the above-mentioned compounds. Bisphenol A is most particularly preferred.

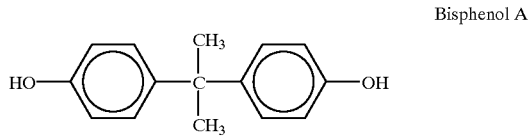

Bisphenol A

The polyglycidyl ethers of polyhydric alcohols are also suitable compounds (d). Examples of such polyhydric alcohols are ethylene glycol, diethylene glycol, triethylene glycol, 1,2-propylene glycol, polyoxypropylene glycols (n=1 –20), 1,3-propylene glycol, 1,4-butylene glycol, pentane-1,5-diol, hexane-1,6-diol, hexane-1,2,6-triol, glycerol and bis-(4-hydroxycyclohexyl)-2,2-propane.

Other suitable compounds (d) are polyglycidyl ethers of polycarboxylic acids obtained by reaction of epichlorohydrin or similar epoxy compounds with an aliphatic, cycloaliphatic or aromatic polycarboxylic acids, such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are adipic acid diglycidyl ester, phthalic acid diglycidyl ester and hexahydrophthalic acid diglycidyl ester.

A comprehensive list of suitable epoxy compounds (d) can be found in:

A. M. Paquin, "Epoxidverbindungen und Epoxidharze", Springer-Verlag, Berlin 1958, Chapter V, pages 308 to 461 and Lee, Neville "Handbook of Epoxy Resins"1967, Chapter 2, pages 201 and 2–33.

Mixtures of several epoxy compounds (d) may also be used,

Amines (e) suitable for the purposes of the invention are primary and/or secondary amines. Preferred amines (e) are polyamines containing at least two nitrogen atoms and at least two active aminohydrogen atoms per molecule. Aliphatic, aromatic, aliphatic-aromatic, cycloaliphatic and heterocyclic di- and polyamines may be used.

The following are examples of suitable amines (e): polyethylene amines (ethylene diamine, diethylene triamine, triethylene tetramine, tetraethylene pentamine, etc.), 1,2-propylene diamine, 1,3-propylene diamine, 1,4-butane diamine, 1,5-pentane diamine, 1,3-pentane diamine, 1,6-hexane diamine, 3,3,5-trimethyl-1,6-hexanediamine, 3,5,5-trimethyl-1,6-hexane diamine, 2-methyl-1,5-pentane diamine, bis-(3-aminopropyl)-amine, N,N'-bis-(3-aminopropyl)-1,2-ethane diamine, N-(3-aminopropyl)-1,2- ethane diamine, 1,2-diaminocyclohexane, 1,3-diaminocyclohexane, 1,4-diaminocyclohexane, aminoethyl piperazines, the poly(alkylene oxide)diamines and triamines (such as, for example, Jeffamine D-230, Jeffamine D-400, Jeffamine D-2000, Jeffamine D-4000, Jeffamine T-403, Jeffamine EDR-148, Jeffamine EDR-192, Jeffamine C-346, Jeffamine ED-600, Jeffamine ED-900, Jeffamine ED-2001), meta-xylyene diamine, phenylene diamine, 4,4'-diaminodiphenyl methane, toluene diamine, isophorone diamine, 3,3'-dimethyl-4,4'-diaminodicyclohexyl methane, 4,4'-diaminodicyclohexylmethane, 2,4'-diaminodicyclohexyl methane, the mixture of poly(cyclohexylaromatic)amines attached by a methylene bridge (also known as MBPCAA) and polyaminoamides.

Other suitable compounds (e) are the reaction products of the amines just mentioned with the above-described α,β-unsaturated carboxylic acid esters (a) and the reaction products of the amines just mentioned with the above-described polyepoxy compounds (d).

The present invention also relates to a process for the production of hardeners for curable epoxy resins comprising the steps of (a) reacting one or more α,β-unsaturated carboxylic acid esters (I)

$$R^2R^3C=C(R^4)COOR^1 \qquad (I)$$

where $R^1$ is an aromatic or aliphatic radical containing up to 15 carbon atoms, the substituents $R^2$, $R^3$ and $R^4$ independently of one another represent hydrogen, branched or unbranched, aliphatic or aromatic groups containing up to 20 carbon atoms or a group —$(CH_2)_n$—$COOR^1$, where $R^1$ is as defined above and n is a number of 0 to 10, in the presence of a transesterification catalyst with (b) one or more hydroxy compounds, compounds (a) and (b) being used in such quantities that the equivalent ratio of the hydroxyl groups in (b) to the ester groups $COOR^1$ in the α,β-unsaturated carboxylic acid esters (a) is in the range from 1.5:1 to 10:1, reacting the intermediate product Z1 obtained with (c) one or more mono-, di- or polyaminopolyalkylene oxide compounds, an equivalent ratio of the reactive hydrogen atoms at the aminonitrogen atoms of (c) to the ester groups in the intermediate compound Z1 in the range from 10:1 to 1:10 being adjusted, subsequently reacting the intermediate product Z2 obtained with (d) one or more polyepoxides, the equivalent ratio of oxirane rings in polyepoxide (d) to reactive hydrogen atoms of the mono-, di- or polyaminopolyalkylene oxide compounds used in (c) being adjusted to a value of 100:1 to 1.5:1, and subsequently reacting the Intermediate product Z3 obtained with (e) one or more primary and/or secondary amines, the equivalent ratio of oxirane rings in the intermediate product Z3 to the reactive H atoms at the aminonitrogen atoms of (e) being adjusted to a value of 1:1.5 to 1:20.

The present invention also relates to aqueous dispersions containing hardeners according to the invention. The content of the hardeners according to the invention in these dispersions is between 40 and 70% by weight, based on the dispersion as a whole.

In many cases, aqueous dispersions containing the hardeners obtainable by the process according to the invention are distinguished by very small mean particle sizes of around 500 nm or smaller. This leads to very favorable material properties of the coatings formed with these dispersions. Particularly favorable material properties are obtained when the mean particle size is below about 300 nm. The mean particle size is defined as the average of the particle sizes which is obtained by adding the values of n individual measurements and then dividing the total by n. For the purposes of the present invention, the mean particle sizes were determined using a "Coulter N4 Plus Submicron Particle Sizer" (manufacturer: Coulter, Miami, Fla. 33196, USA). This instrument uses the scattering of laser light at a heavily diluted dispersion for particle size determination. It performs a number of individual measurements and gives the mean particle size as the end result. The above-mentioned values relate to scattering measurements at an angle of 90° relative to the incident laser beam.

The reactive hardeners according to the invention are suitable in combination with suitable epoxy resins and additives for the production of coatings, intermediate coatings, paints, molding compositions and curable pastes for various applications. For example, they may be used for the production of protective and/or decorative coatings on various, above all rough and porous substrates such as, for example, wood, mineral substrates (for example concrete and stone), glass, plastics (for example polyethylene, polypropylene), compost materials, ceramics and pretreated or non-pretreated metals. Their favorable properties also make the hardeners according to the invention eminently suitable for one-coat lacquering/painting. The adhering coating layer may remain unchanged as such although it may also serve as an intermediate layer, i.e. as a substrate for further coatings which in turn may consist of the same coating material or of another typical coating material. By virtue of their good dilutability and their favorable properties, the hardeners according to the invention or rather the dispersions prepared from them are also suitable for additional use in electrodeposition painting. The hardeners according to the invention may also be used for the production of water-dilutable adhesives. They may also be used as binders for textile, organic and/or inorganic materials and as an additive in plastic cements.

Accordingly, the present invention also relates to the use of the hardeners according to the invention for systems (compositions) for coating solid substrates.

Where the hardeners according to the invention are used for curing epoxy resins, other suitable hardeners (for example polymercaptans, polyisocyanates, imidazoles, polyamidoamines and any of the amines (e)) and the additives typically used in the coating industry may also be used.

EXAMPLES

I. Intermediate Products (Resins)

Example 1

17.5 g of diethyl maleate and 123.0 g of Sovermol 908 (dimerdiol of Henkel Corporation) were introduced under nitrogen into a reactor together with 0.28 g of dibutyl tin diacetate and heated for 2 hours to 200° C. The ethanol released during the transesterification was continuously distilled off. 200 g of monoaminopolyethylene oxide ("Jeffamine M 2070", Huntsman) were then added dropwise at 80° C., followed by stirring for another hour at 80° C. After the addition of 456 g of Chemres E20 (bisphenol A-based epoxy resin of Henkel SpA, average epoxy equivalent weight ca. 190 g) and 0.5 g of triphenyl phosphine, the reaction mixture was heated for another 2 hours at 180° C.

Example 2

35.0 g of diethyl maleate and 146.0 g of Sovermol 908 were introduced under nitrogen into a reactor together with 0.56 g of dibutyl tin diacetate and heated for 2 hours to 200° C. The ethanol released during the transesterification was continuously distilled off. 200 g of Jeffamine M 2070 were then added dropwise at 80° C., followed by stirring for another hour at 80° C. After the addition of 912 g of Chemres E20 and 1.0 g of triphenyl phosphine, the reaction mixture was heated for another 2 hours at 180° C.

II. Hardeners According to the Invention (In Water)

Example 3

52.0 g of diethylenetriamine (DETA) were introduced into a reactor and 200 g of the resin produced as described in Example 1 were added dropwise at 80° C., followed by stirring for another hour at 80° C. After addition of 252 g of water at 70° C., a 50% by weight yellowish solution highly viscous at room temperature was obtained.

Example 4

68.1 g of m-xylylene diamine (MXDA) were introduced into a reactor and 200 g of the resin produced as described in Example 1 were added dropwise at 80° C., followed by stirring for another hour at 80° C. After addition of 402 g of water with stirring at 65° C., a 40% by weight aqueous dispersion highly viscous at room temperature was obtained.

Example 5

69.4 g of diethylenetriamine (DETA) were introduced into a reactor and 200 g of the resin produced as described in Example 2 were added dropwise at 80° C., followed by stirring for another hour at 80° C. After addition of 20 g of ethoxypropanol and 249.4 g of water at 70° C., a 50% by weight yellowish solution highly viscous at room temperature was obtained.

What is claimed is:

1. A process for producing hardeners for epoxy resins, the process comprising:
   (i) reacting (a) one or more α,β-unsaturated carboxylic acid esters of the general formula (I), $$R^2R^3C\!=\!C(R^4)COOR^1 \quad (I)$$

with (b) one or more hydroxy compounds having one or more hydroxyl groups, wherein $R^1$ represents a hydrocarbon radical having up to 15 carbon atoms, wherein $R^2$, $R^3$, and $R^4$ each independently represents a substituent selected from the group consisting of hydrogen, hydrocarbon radicals having up to 20 carbon atoms, and $-(CH_2)_n-COOR^1$, wherein $R^1$ is as defined above and n represents a number of from 0 to 10, and wherein (a) and (b) are present in quantities such that the equivalent ratio of the hydroxyl groups in (b) to the ester groups $-COOR^1$ in (a) is from 1.5:1 to 10:1, to form an intermediate product Z1 having a number of ester groups;
   (ii) reacting the intermediate product Z1 with (c) one or more aminopolyalkylene oxide compounds having at least one aminonitrogen atom with one or more reactive hydrogen atoms, wherein the intermediate product Z1 and the one or more aminopolyalkylene oxide compounds are present in quantities such that the equivalent ratio of reactive hydrogen atoms in (c) to the ester groups in the intermediate product Z1 is from 10:1 to 1:10, to form an intermediate product Z2;
   (iii) reacting the intermediate product Z2 with (d) one or more polyepoxides having a number of oxirane rings, wherein the intermediate product Z2 and the one or more polyepoxides are present in quantities such that the equivalent ratio of the oxirane rings to the reactive hydrogen atoms in (c) is from 100:1 to 1.5:1, to form an intermediate product Z3 having a number of oxirane rings; and
   (iv) reacting the intermediate product Z3 with (e) one or more amines selected from the group consisting of primary amines and secondary amines having at least one aminonitrogen atom with one or more reactive hydrogen atoms, wherein the intermediate product Z3 and the one or more amines are present in quantities such that the equivalent ratio of the oxirane rings in the intermediate product Z3 to the reactive hydrogen atoms in (e) is from 1:1.5 to 1:20.

2. The process according to claim 1, wherein the (a) one or more α,β-unsaturated carboxylic acid esters of the general formula (I) comprises a dialkyl maleate.

3. The process according to claim 2, wherein the dialkyl maleate is selected from the group consisting of dimethyl maleate, diethyl maleate and mixtures thereof.

4. The process according to claim 1, wherein the (b) one or more hydroxy compounds comprises a dimerdiol.

5. The process according to claim 1, wherein the (c) one or more aminopolyalkylene oxide compounds comprises a monoaminopolyalkylene oxide compound.

6. The process according to claim 5, wherein the monoaminopolyalkylene oxide compound corresponds to the general formula (II):

$$R^8\!-\!O\!-\!R^9\!-\!CH_2CH(R^{10})\!-\!NH_2 \quad (II)$$

wherein $R^8$ represents a monofunctional organic group having from 1 to 12 carbon atoms, $R^9$ represents a polyoxyalkylene group having from 5 to 200 polyoxyalkylene units selected from the group consisting of ethylene oxide, propylene oxide and statistical or block mixtures thereof, and $R^{10}$ represents hydrogen or an aliphatic radical having from 1 to 4 carbon atoms.

7. The process according to claim 5, wherein the monoaminopolyalkylene oxide compound has an average molecular weight of from 148 to 5000.

8. The process according to claim 1, wherein the intermediate product Z1 and the one or more aminopolyalkylene oxide compounds are present in quantities such that the equivalent ratio of the reactive hydrogen atoms in (c) to the ester groups in the intermediate product Z1 is from 4:1 to 1:4.

9. The process according to claim 1, wherein the intermediate product Z2 and the one or more polyepoxides are present in quantities such that the equivalent ratio of the oxirane rings to the reactive hydrogen atoms in (c) is from 50:1 to 10:1.

10. A hardener for epoxy resins, said hardener produced by the process according to claim 1.

11. A hardener for epoxy resins, said hardener produced by the process according to claim 2.

12. A hardener for epoxy resins, said hardener produced by the process according to claim 4.

13. A hardener for epoxy resins, said hardener produced by the process according to claim 5.

14. An aqueous dispersion comprising a hardener according to claim 10.

15. The aqueous dispersion according to claim 14, wherein the hardener comprises dispersed particles having a mean particle size of 500 nm or less.

* * * * *